(No Model.)

L. PETTERSON.
BOX FASTENER.

No. 404,728. Patented June 4, 1889.

Witnesses:
Carl E. Gaylord.
Clifford W. White

Inventor:
Ludwig Petterson,
By Banning & Banning & Payson,
Attys.

UNITED STATES PATENT OFFICE.

LUDWIG PETTERSON, OF CHICAGO, ILLINOIS.

BOX-FASTENER.

SPECIFICATION forming part of Letters Patent No. 404,728, dated June 4, 1889.

Application filed September 29, 1888. Serial No. 286,808. (No model.)

*To all whom it may concern:*

Be it known that I, LUDWIG PETTERSON, a citizen of the United States, residing at Chicago, Illinois, have invented certain new and useful Improvements in Fasteners for Boxes, Crates, Pails, &c., of which the following is a specification.

The object of my invention is to provide a simple and economical metallic fastener, dispensing with the nails ordinarily employed, or, rather, in providing the fastener with its own nails made integral therewith; and my invention consists in the details and features of construction hereinafter described and claimed.

Figure 1:
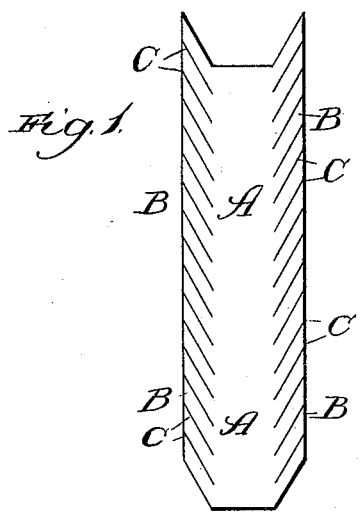
Figure 2:
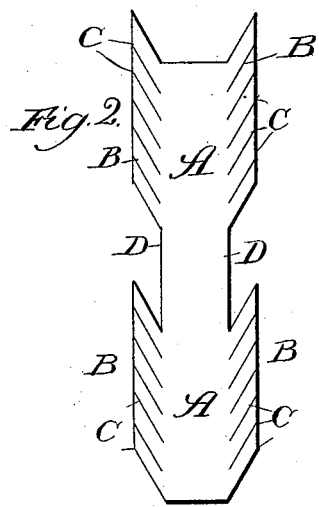
Figure 3:
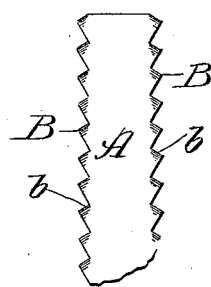
Figure 4:
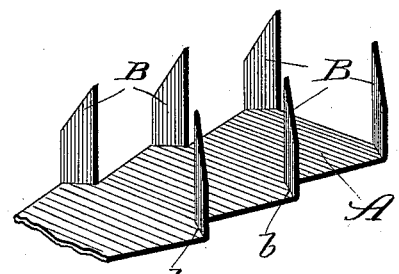
Figure 5:
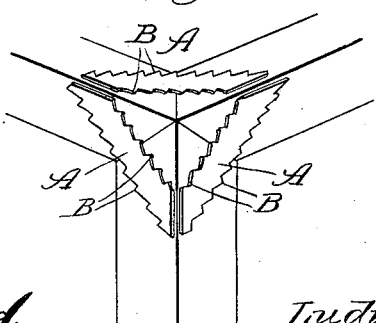

In the drawings, Figure 1 is a plan view of my fastener as it appears after the points are cut, but before they are bent; Fig. 2, a plan view of a modified form thereof; Fig. 3, a plan view of the completed fastener, looking at the upper side thereof; Fig. 4, a perspective view of the completed fastener, showing the points. Fig. 5 is a view of the fastener applied to the corner of a box.

A is the body of the fastener; B, the points or nails, and C slits or grooves between the separate points.

In making my improved fastener I take a strip of band-iron or any other suitable material, preferably about an inch in width, though the width is of no special importance, and in each side thereof I make a series of cuts, as shown in Figs. 1 and 2 of the drawings. These cuts extend into the iron about one-fourth of an inch at each side, leaving an uncut strip in the center of about one-half an inch in width when inch-wide material is used. These cuts are shown in the drawings as made at an angle of about forty-five degrees and about three-eighths of an inch apart, and I prefer that they be so made; but I do not intend to limit myself to any particular angle or distance apart. I then bend the teeth or points B which are formed by these cuts approximately at right angles to the plane of the strip A, when they will appear as in Fig. 4. This cutting and bending may be done by hand or by machinery, or in any other suitable manner. When the teeth are bent as shown in Figs. 3 and 4, they will be bent on a line at an angle to the longitudinal axis of the strip, which will insure the proper separation of the teeth from each other. The line on which the teeth are bent is indicated by the letter $b$.

This fastener is intended to be used to hold together boxes, pails, crates, and other similar structures, and may be used in place of the band or hoop iron now employed for that purpose. It may be made in any desired length, and is used by taking a piece of requisite length and bending it around the box and then simply hammering the points in, as though they were so many nails made integral with the strip. I also contemplate using this fastener in connection with the boxes for which Letters Patent of the United States Nos. 378,601 and 379,652 were issued to Albert T. Linderman on the 28th day of February and on the 20th day of March, 1887, and also the box described and claimed in an application for Letters Patent, No. 238,092, filed May 10, 1887, by the said Linderman. When so used, they are applied, as shown in Fig. 5 of the drawings, to hold two of the adjacent top rails and intermediate corner-post together by taking three short strips of the material and fastening one across from each of the top rails to the corner-post and the third across from rail to rail, so that the three pieces form a triangle, as it were. In using this fastener to hold together packing-boxes and similar structures it may be found that in bending the strip around the corner the adjacent teeth will become entangled with each other, rendering it difficult to drive them into the wood. To obviate this is the object of the modification of my device shown in Fig. 2, in which I have left a space D blank, cutting no teeth therein, the intention being to have this blank space fit around the edge.

The cuts C may be made by any die or other machinery suitable for the purpose, and may be made one or many at a time, and, although I have spoken of them as extending into the metal about one-fourth of an inch, it is obvious that if much broader metal be used the cuts may be made deeper, the purpose being not to make the cuts so deep as to leave a weak strip in the center, while at the same time so deep that the points or nails formed by them should be long enough to hold the strip firmly to the wood.

I claim—

1. As a new article of manufacture, a metallic fastener consisting of a center strip having a row of teeth along each edge with parallel sides and bent out of the plane of the strip on a line at an angle to the axis of the center strip, substantially as described.

2. As a new article of manufacture, a metallic fastener consisting of a center strip, a row of teeth along each side of and bent at an angle to this strip, a portion of said strip being left without teeth, whereby it is adapted to be bent around a corner, substantially as described.

LUDWIG PETTERSON.

Witnesses:
WILLIAM O. TEGTMEYER,
GEORGE S. PAYSON.